Patented Nov. 18, 1924.

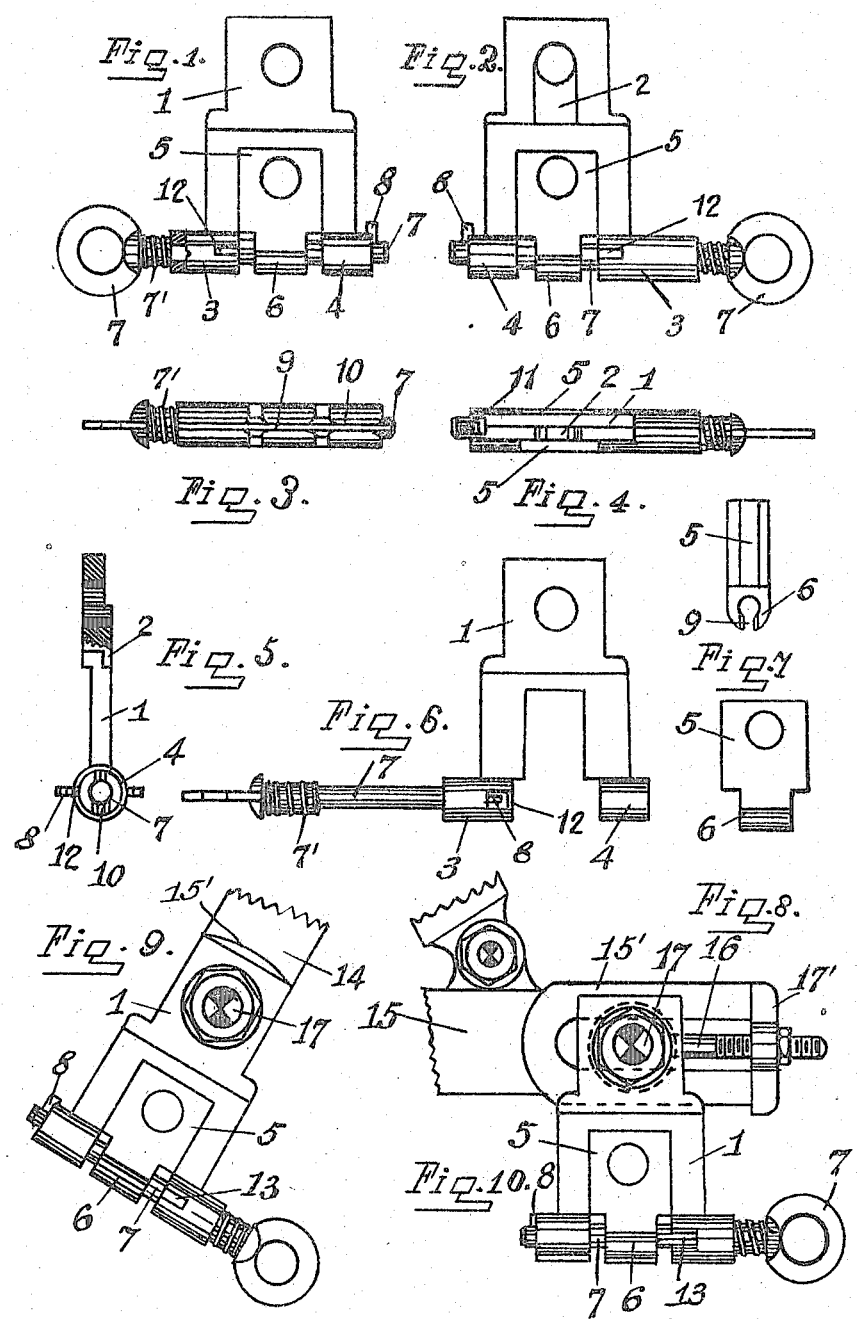

1,515,767

UNITED STATES PATENT OFFICE.

GUSTAV DAHLHAUS, OF COBLENZ, GERMANY.

BEARING SUPPORT WITH BOLTING BARS OR PINS FOR BICYCLES, MOTOR CYCLES, AND SUCH LIKE VEHICLES.

Application filed December 24, 1923. Serial No. 682,572.

*To all whom it may concern:*

Be it known that I, GUSTAV DAHLHAUS, a citizen of Germany, residing at Coblenz, in Prussia, Germany, have invented new and useful Bearing Supports with Bolting Bars or Pins for Bicycles, Motor Cycles, and such like Vehicles (for which I have filed applications in Germany, December 23, 1922, B. 107778 II/63h), of which the following is a specification.

This invention relates to a wheel support for bicycles and the like of the kind adapted for an easy detachment of the wheels, and consists in forming the forked supporting bracket with eyelets for the reception of a slidable bolt whereby a bearing plate which is detachably held between the fork members, can be locked in position, the supporting bracket being connected to the bicycle frame in known manner.

The fastening bolt is spring-pressed and fitted with a lug which enables it to interlock with a notch in the bracket so as to secure the bolt in shot position, slots being formed in the guide elements as passages through which the lug can pass when the bolt is shot or retracted.

Fig. 1 of the accompanying drawings represent a front view of the complete device, Fig. 2, a rear view, Fig. 3, a bottom view, and Fig. 4, a top view of the same, Fig. 5, is an edge view of the supporting bracket, partly in section, and Fig. 6, a front view of the bracket with retracted fastening bolt.

Figs. 7 and 8 are views at right angles of the bearing plate.

Fig. 9 shows a wheel support connected to the front fork of the bicycle, and

Fig. 10, shows the support connected to the rear fork.

The wheels are supported in the frame forks of a bicycle or the like by means of forked brackets 1 and by means of bearing plates 5 which are held between the fork members.

The plates 5 are formed with channelled edges (Fig. 7) which engage the fork members and which enable them to be slid into and out of position so that the wheel can be fitted into and removed from the bicycle by a mere insertion of the plate into and withdrawal of the same from the bracket. In order to lock the bearing plate to the bracket, a fastening bolt 7 is provided for the reception of which the members of the fork 1 are provided with coaxial eyelets or like guide members 3 and 4 respectively. The plate 5 may also be provided with an eyelet 6 for the reception of the bolt, but this eyelet can be reduced to a mere groove or channel formation produced at the end of the plate. The bolt 7 has at its outer end a lug 8 adapted to interlock with a notch 11 made in the upper part of the eyelet 4. A spring 7', which is arranged on the bolt between its head and the eyelet 3, holds the lug 8 in engagement with the notch 11 and thus secures the bolt in shot position. Diametrically opposite the notch 11 there is a slot 10 which extends right through the eyelet as a passage through which the lug can pass when the bolt is shot or retracted. The eyelet 6, if present, has a corresponding slot 9, and this eyelet is reduced in width, so that a space is formed through which the lug 8 can be turned into a horizontal position for engagement with a notch 12 in the eyelet 3. With the lug 8 retracted into the notch 12, as shown in Fig. 6, the passage is clear so that the plate 5 can be inserted and removed.

By the arrangement, therefore, the wheels can be secured to and detached from the machine by a mere adjustment of two bolts 7, one at each side of the wheel, the plate 5, to which the wheel axle is attached, being left undisturbed relative to the latter.

The brackets 1 are fastened to the frame forks by means of screw bolts 17. A fillet 2 on the bracket engages an elongated slot in the fork end of the frame and determines the angular position of the bracket relative to the frame. The brackets used for the front fork 14 have their fillets 2 arranged in a longitudinal position, as shown in Fig. 2. The rear wheel brackets have their fillets arranged horizontally so as to hold the brackets in an upright position by engagement with the slots in the fork ends $15^1$ of the chain stays 15. The chain tensioning bolt 16 is connected to the screw bolt 17 and supported on the fork end $17^1$ in the usual manner.

The supporting bracket for the front wheel may be adapted to embrace the fork members 14, and they may, if desired, be brazed to the latter. In making the bicycle frame, the fork ends 15¹ are preferably set off so that the position of the frame relative to the wheel axle will be the normal one. The device may be used in connection with fixed as well as free-wheel drive and also with backpedalling brakes,

Having thus described my invention, what I claim and desire to secure by Letters Patent is:—

1. A wheel support for bicycles and the like, comprising a supporting fork having a bearing plate held detachably between its fork members and being formed with eyelets for the reception of a slidable fastening bolt whereby the bearing plate can be locked in position, the supporting fork being connected to the fork ends of the bicycle frame in known manner.

2. A wheel support according to claim 1 in which the fastening bolt is spring pressed and formed with a lug adapted, under the action of the spring, to engage a notch in the fork so as to lock the bolt in shot position, the guide eyelets being formed with slots through which the lug can pass when the bolt is shot and retracted.

In testimony whereof I affixed my signature in presence of two witnesses.

GUSTAV DAHLHAUS.

Witnesses:
 PETER MEFFERT,
 C. E. MACY.